(12) United States Patent
Cheng et al.

(10) Patent No.: US 8,169,730 B2
(45) Date of Patent: May 1, 2012

(54) SUPPRESSING ADJACENT TRACK INTERFERENCE/FAR TRACK INTERFERENCE (ATI/FTI) IN A HARD DISK DRIVE (HDD) BY AN EXTERNAL MAGNETIC FIELD

(75) Inventors: Nelson Cheng, Fremont, CA (US); Lakshmi Ramamoorthy, San Jose, CA (US); Kris Schouterden, San Jose, CA (US); Masayoshi Shimokoshi, Kanagawa (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 0 days.

(21) Appl. No.: 12/641,292

(22) Filed: Dec. 17, 2009

(65) Prior Publication Data
US 2011/0149427 A1 Jun. 23, 2011

(51) Int. Cl.
*G11B 5/02* (2006.01)
(52) U.S. Cl. ......................................................... 360/55
(58) Field of Classification Search .................. None
See application file for complete search history.

(56) References Cited

U.S. PATENT DOCUMENTS

| | | | | |
|---|---|---|---|---|
| 6,570,727 B1 * | 5/2003 | Tamura et al. | ............. | 360/66 |
| 6,846,581 B2 * | 1/2005 | Oikawa et al. | ............. | 360/324 |
| 6,900,956 B2 * | 5/2005 | Kitahori et al. | ............. | 360/66 |
| 7,070,716 B2 * | 7/2006 | Lam | ............. | 360/125.04 |
| 7,301,714 B2 * | 11/2007 | Nishikawa | ............. | 360/17 |
| 7,397,633 B2 * | 7/2008 | Xue et al. | ............. | 360/125.3 |
| 7,548,406 B2 * | 6/2009 | Yoon | ............. | 361/139 |
| 7,626,800 B2 * | 12/2009 | Yoon | ............. | 361/139 |
| 7,706,102 B1 * | 4/2010 | Gershman et al. | ............. | 360/66 |
| 7,724,490 B2 * | 5/2010 | Tamura et al. | ............. | 361/149 |
| 2006/0072227 A1 * | 4/2006 | Aoki et al. | ............. | 360/17 |

OTHER PUBLICATIONS

Vea, et al., "Magnetic Recording Channel Model With Intertrack Interference", *IEEE*, (1991),4834-4836.
Soeno, et al., "Feasibility of Discrete Track Perpendicular Media for High Track Density Recording", *IEEE*, (2003),64-64.
Tang, et al., "Understanding Adjacent Track Erasure in Discrete Track Media", *IEEE*, (Sep. 2008),1-4.
Jiang, et al., "Cross-Track Noise Profile Measurement for Adjacent-Track Interference Study and Write-Current Optimization in Perpendicular Recording", *Journal of Applied Physics*, vol. 93, Issue 10, (May 15, 2003),93, 6754.
Berghof, W. "Head and Media Requirements for High Density Recording", *VLSI and Microelectronic Applications in Intelligent Peripherals and their Interconnection Networks*, (May 8, 1989),97-99.
IP.COM, "Prevention of Adjacent Track Interference on HDDs", IP.com, (2004),1-2.

* cited by examiner

*Primary Examiner* — Will J Klimowicz
*Assistant Examiner* — James L Habermehl

(57) ABSTRACT

A hard disk drive (HDD) comprising a magnetic disk that includes a data storage surface and an external magnetic field parallel to the data storage surface for suppressing track interference.

12 Claims, 6 Drawing Sheets

SUPPRESSING ADJACENT TRACK INTERFERENCE/FAR TRACK INTERFERENCE (ATI/FTI) IN A HARD DISK DRIVE (HDD) BY AN EXTERNAL MAGNETIC FIELD

BACKGROUND

Previously written data on a track progressively degrades in relation to the number of writings on adjacent tracks. As areal density increases, track pitches narrow and writing becomes stronger. Accordingly, deleterious affects of Adjacent Track Interference/Far Track Interference (ATI/FTI) will increase because of stronger interference from adjacent tracks. For example, stronger writing is required to overcome increased disk coercivity to support the increase in linear densities. As a result, ATI/FTI will increase because of the stronger writing.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
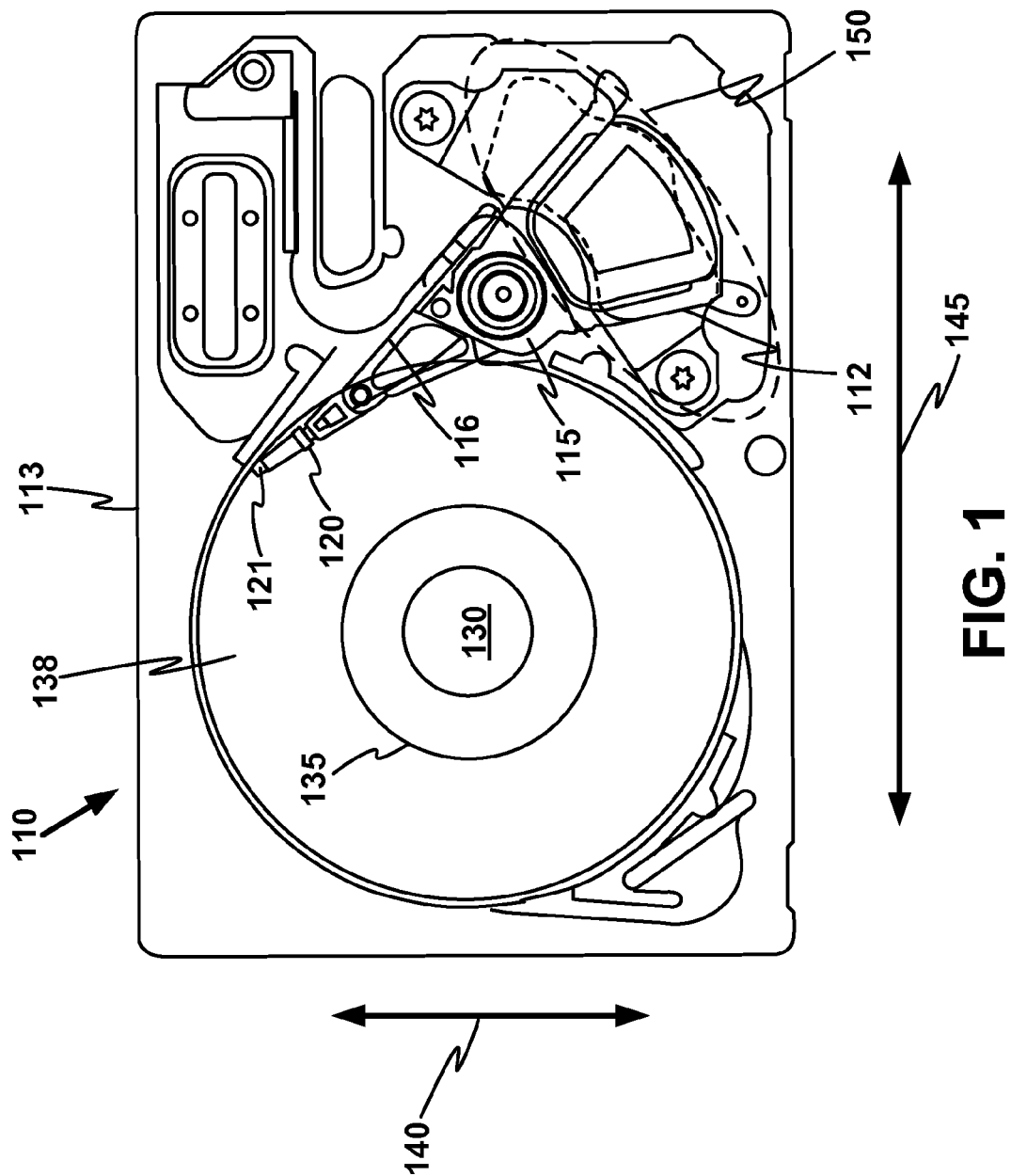
FIGS. 1-3 illustrate examples of a HDD, in accordance with embodiments of the present invention.

With reference now to FIG. 1, a schematic drawing of one embodiment of an information storage system including a magnetic hard disk file or HDD 110 for a computer system is shown, although only one head and one disk surface combination are shown. What is described herein for one head-disk combination is also applicable to multiple head-disk combinations. In other words, the present technology is independent of the number of head-disk combinations.

In general, HDD 110 has an outer sealed housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 115 includes one or more actuator arms 116. When a number of actuator arms 116 are present, they are usually represented in the form of a comb that is movably or pivotally mounted to base/housing 113. A controller 150 is also mounted to base 113 for selectively moving the actuator arms 116 relative to the disk 138. Actuator assembly 115 may be coupled with a connector assembly, such as a flex cable to convey data between arm electronics and a host system, such as a computer, wherein HDD 110 resides.

In one embodiment, each actuator arm 116 has extending from it at least one cantilevered integrated lead suspension (ILS) 120. The ILS 120 may be any form of lead suspension that can be used in a data access storage device. The level of integration containing the slider 121, ILS 120, and read/write head is called the Head Gimbal Assembly (HGA).

The ILS 120 has a spring-like quality, which biases or presses the air-bearing surface of slider 121 against disk 138 to cause slider 121 to fly at a precise distance from disk 138. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 116 opposite the head gimbal assemblies. Movement of the actuator assembly 115 by controller 150 causes the head gimbal assembly to move along radial arcs across track(s) 135 on the surface of disk 138.

During a read or write (read/write) operation, slider 121 travels along a track (e.g., 135) to read/write data from or to disk a track(s) on disk 138. During a write operation, a write head (not shown) generates a magnetic field to write data to a track. Ideally, the magnetic field affects only the data track that the write head is writing data to. However, the magnetic field can leak out (beyond the particular track that data is being written to) to adjacent tracks (which have previously written data stored on). In other words, ATI is when a particular track on a HDD is written a large number of times without the adjacent track(s) being written, then the data on those adjacent track(s) can become corrupted. This constant overwrite causes some magnetic flux interference on the adjacent tracks that, over many cycles, can accumulate and leave the adjacent tracks unreadable.

For example, track X will have adjacent tracks X+1 and X−1. If track X is written a large number of times before tracks X+1 or X−1 are also written, then the data on X+1 or X−1 could become corrupted.

Likewise, Far Track Interference (FTI) is when a constant overwrite on a particular track causes some magnetic flux interference on non-adjacent tracks that, over many cycles, can accumulate and leave the non-adjacent tracks unreadable During a write process, a write current is generated and passes through writer coils. A magnetic flux is generated in the writer pole by the electrical current. The generated write flux circulates from the write pole, writes the data into the recording media, and returns to the write return pole, forming a closed flux loop. The magnetic states in the writer pole and the writer structure (i.e. wrapped around shield (WAS)) are excited during writing. Occasionally, the magnetic structures in the writer pole and/or WAS are more susceptible to flux leakages and result in magnetic interferences at adjacent tracks.

An external magnetic field, H, is generated to suppress and/or reduce the ATI/FTI. When external magnetic field, H, is applied along the surface of the recording media, the unfavorable magnetic structures can be either stabilized or flipped to favorable states during writing. Consequently, the flux leakages are suppressed and therefore ATI/FTI are minimized. In one embodiment, H is directed in an in-out direction 145 with respect to HDD 110. For example, in-out direction 145 is a direction along the length of or the longitudinal direction of HDD 110. In another embodiment, H is directed in an in-plane direction 140 with respect to HDD 110. For example, in-plane direction 140 is in the direction of the width of HDD 110 or orthogonal to in-plane direction 140. In a further embodiment, H is directed in a radial direction across data track 135. In various embodiments, H is directed in any direction (e.g., 140 and/or 145) that is parallel to a data storage surface of disk 138. Accordingly, H is not directed in a direction perpendicular (e.g., in and out of the page) to a data storage surface to suppress and/or reduce ATI/FTI. In one embodiment, an H of about 60 Oersted (Oe) applied in direction 145 eliminates ATI/FTI.

Figure 2:
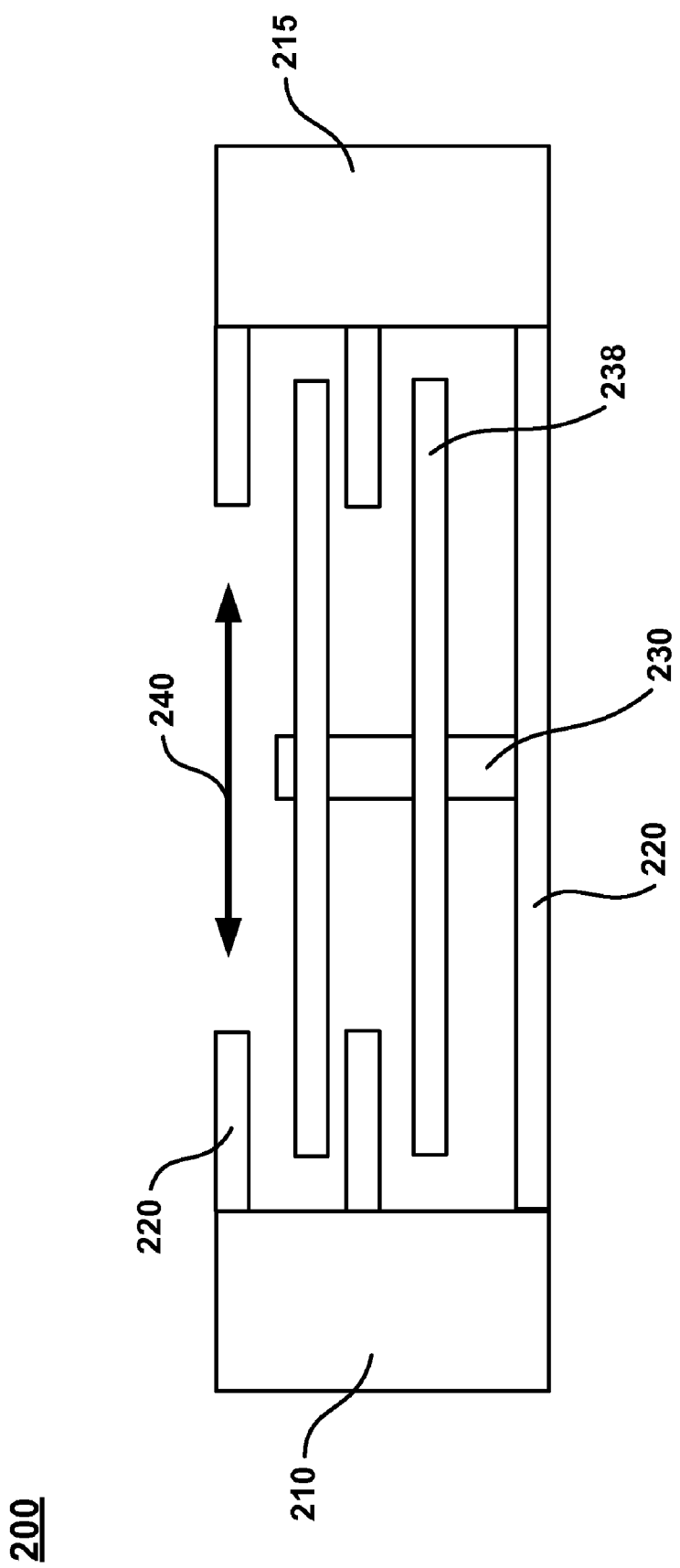

FIG. 2 depicts a HDD 200, in accordance to an embodiment. HDD 200 includes disks 238 that rotate on spindle 230. A permanent magnet 210 is disposed along a perimeter of disks 238. Permanent magnet 210 generates a magnetic field, H, in the direction of arrow 240 that is parallel to disk 238. H can be guided by way of ferromagnetic material 220 (e.g., soft iron).

In one embodiment, HDD 200 can include another permanent magnet 215 that is paired with permanent magnet 210 to generate H and facilitate in suppressing ATI/FTI. In another embodiment, a permanent magnet (e.g., 210) can be provided by an actuator arm. It should be appreciated a permanent magnet generates a continuous and consistent magnetic field in direction 240.

FIG. 2 depicts two permanent magnets 210 and 215, however, HDD 222 can include a single permanent magnet or any number of paired permanent magnets at any location and/or orientation within HDD 200 that are compatible to generating a magnetic field parallel to disks 238.

Figure 3:
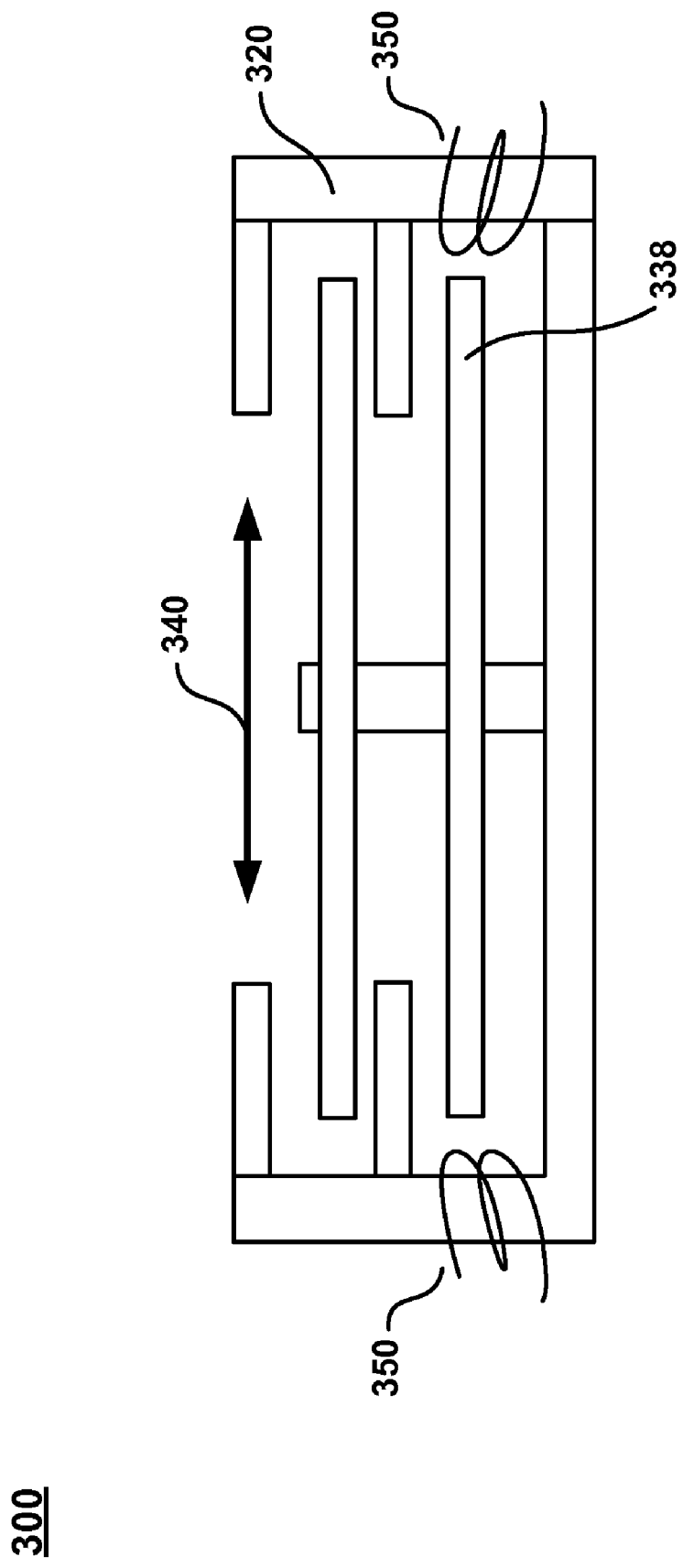

FIG. 3 depicts an HDD 300, in accordance to an embodiment. HDD 300 includes a disk 338 and electric circuit 350. Ferromagnetic material 320 is disposed around disk 338. Electrical circuit 350 is disposed around ferromagnetic material 320. When an electrical current flows through electrical circuit 350, the combination of electrical circuit 350 and ferromagnetic material 320 generates a magnetic field in a direction of arrow 340. It should be appreciated that generated magnetic field is substantially parallel to the surface of the disk 338. It should also be appreciated that HDD 300 can include any number of electrical circuits at any location and/or orientation that are compatible to generating a magnetic field parallel to disk 338. In one embodiment, the electric current source can be synchronized with the write gate (not shown) so that electrical circuit 350 is on when HDD is writing, which also results in saving power.

Figure 4:
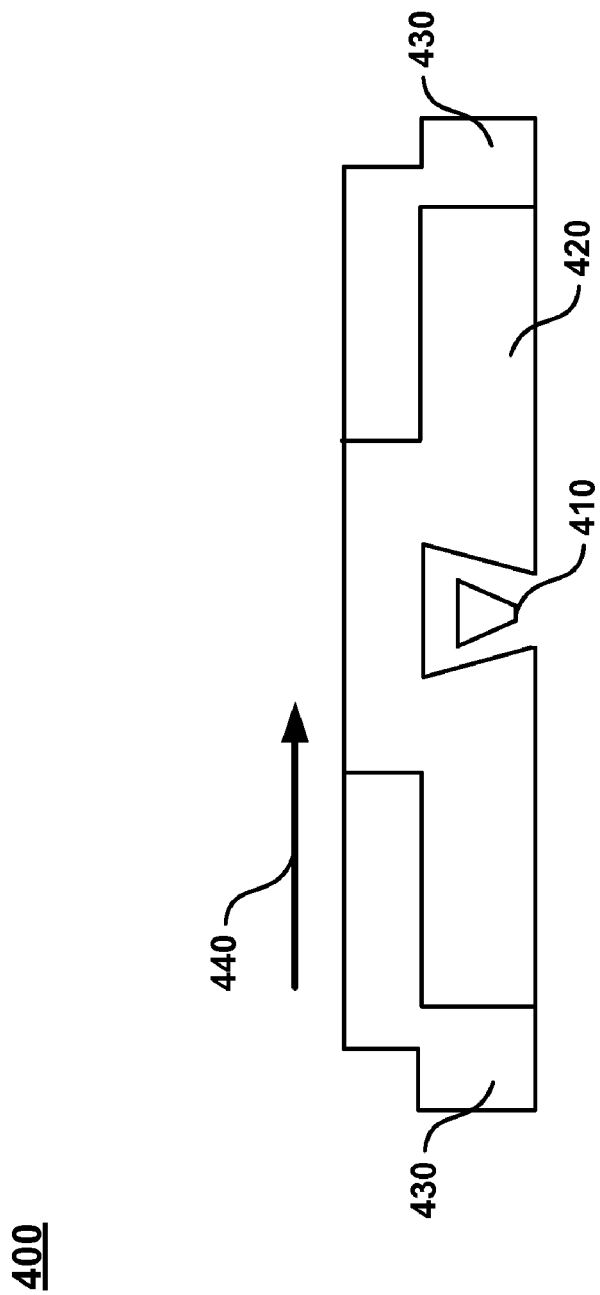
FIG. 4 illustrates an example of a writer, in accordance with an embodiment of the present invention.

FIG. 4 depicts a writer 400, in accordance to an embodiment. Writer 400 includes writer pole 410, WAS 420 and a hard bias layer 430. In one embodiment, hard biased layer 430 surrounds both sides of WAS 420. Hard biased layer 430 can be initialized by an external field along the direction 440, which is parallel to the storage media (not shown). Hard biased layer 430 can provide a magnetic field even if the initializing external field is removed.

It should be appreciated that hard biased layer 430 can be fabricated by thin film deposition methods, plating or sputtering, and the materials can be various kinds of permanent materials, i.e., CoNiFe. The thickness and the material compositions can be tailored to supply different strength of magnetic fields required for various applications.

Figure 5:
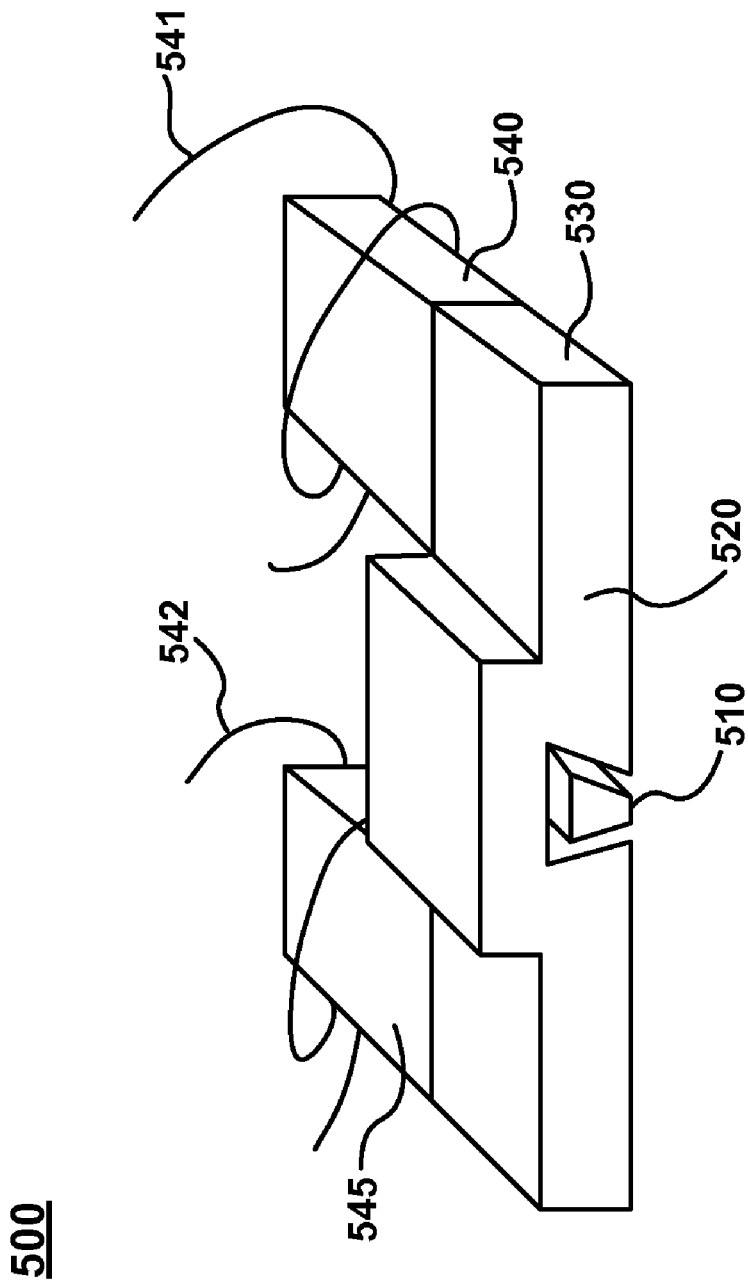
FIG. 5 illustrates an example of a writer, in accordance with an embodiment of the present invention.

FIG. 5 depicts a writer 500, in accordance to an embodiment. Writer 500 includes writer pole 510, WAS 520 and ABS 530. Yoke 540 and yoke 545 are each attached to the rear side of WAS 520, away from ABS 530. Yoke 540 and yoke 545 are wound by coils 541 and 542, respectively, which electrically connect to writer coils (not shown). During a writing process, the writer coils are excited and an electrical current produces writing magnetic flux through writer poles (e.g., 510). The same write current also produces magnetic flux in yokes 540 and 545 to provide stabilizing magnetic field to suppress unfavorable magnetic states in the writer pole or WAS and therefore reduce ATI/FTI. It should be appreciated that the yoke materials are usually made of ferromagnetic materials and have good permeability.

In one embodiment, yoke 540 and yoke 545 are connected to a writer stitched pole (not shown) or a return pole (not shown). The magnetic flux generated in the stitch pole or the return pole during writing can branch into the WAS through the yoke to provide stabilizing field for the WAS and the writer pole.

Figure 6:
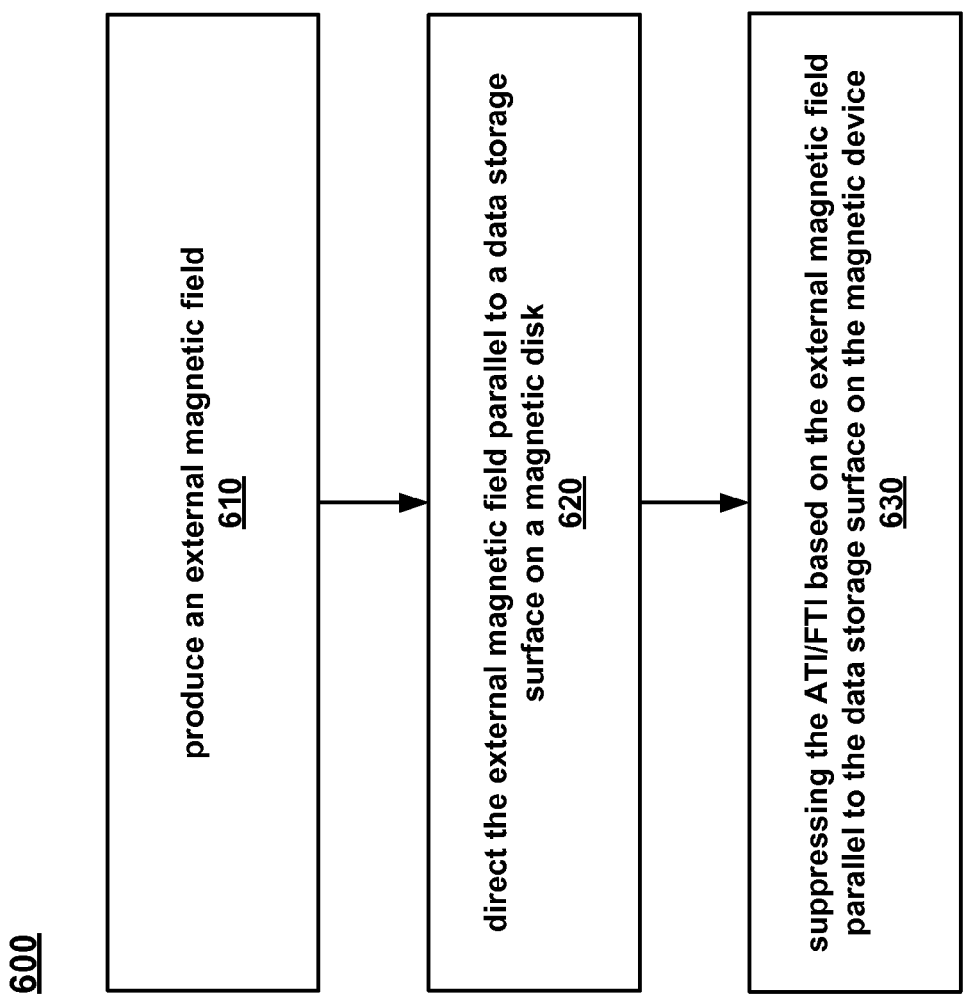
FIG. 6 illustrates an example of a flow chart of a method for suppressing ATI/FTI, in accordance with an embodiment of the present invention.

FIG. 6 depicts a method 600 for suppressing ATI/FTI, in accordance with an embodiment of the present invention. At 610 of method 600, an external magnetic field is produced. In one embodiment, the external magnetic field is produced by disposing at least one pair of permanent magnets in the HDD. In another embodiment, the external magnetic field is produced by disposing an electromagnet in the HDD. In a further embodiment, the external magnetic field is produced by disposing a hard bias layer on a wrap around shield. In yet another embodiment, the external magnetic field is produced by disposing a writing yoke on a wrap around shield.

At 620, the external magnetic field is directed parallel to a data storage surface on a magnetic disk. In one embodiment, the external magnetic field is directed in an in-out direction of the HDD. In another embodiment, the external magnetic field is directed in an in-plane direction of the HDD. In a further embodiment, the external magnetic field is directed perpendicular to a track on the data storage surface.

At 630, the ATI/FTI is suppressed based on the external magnetic field parallel to the data storage surface on the magnetic device. In another embodiment, read/write operations are synchronized with suppressing the ATI/FTI based on the external magnetic field.

Various embodiments of the present invention are thus described. While the present invention has been described in particular embodiments, it should be appreciated that the present invention should not be construed as limited by such embodiments, but rather construed according to the following claims.

The invention claimed is:

1. A hard disk drive (HDD), comprising:
a magnetic disk, comprising a data storage surface; and
an electromagnet physically separate from a write head; said electromagnet comprising:
a track interference suppressor configured for suppressing track interference by generating an external magnetic field that is substantially parallel to said data storage surface, said generating occurring while said write head writes on said data storage surface.

2. The HDD in claim 1, comprising:
a data track on said data storage surface, wherein said external magnetic field is radial across said data track.

3. The HDD of claim 1, wherein said external magnetic field comprises:
an external magnetic field generated within said HDD.

4. The HDD of claim 1, wherein said external magnetic field comprises:
an external magnetic field in an in-out direction of said HDD.

5. The HDD of claim 1, wherein said external magnetic field comprises:
an external magnetic field in an in-plane direction of said HDD.

6. The HDD of claim 1, wherein said track interference comprises:
Adjacent Track Interference (ATI).

7. The HDD of claim 1, wherein said track interference comprises:
Far Track Interference (FTI).

8. A method for suppressing Adjacent Track Interference/Far Track Interference (ATI/FTI) in a hard disk drive (HDD), said method comprising:
producing an external magnetic field by an electromagnet physically separate from a write head;
directing said external magnetic field parallel to a data storage surface on a magnetic disk; and
suppressing said ATI/FTI based on said external magnetic field parallel to said data storage surface on said magnetic disk; wherein said suppressing occurs while said write head writes on said data storage surface.

9. The method of claim 8, wherein said directing said external magnetic field parallel to a data storage surface on a magnetic disk comprises:
directing said external magnetic field in an in-out direction of said HDD.

10. The method of claim 8, wherein said directing said external magnetic field parallel to a data storage surface on a magnetic disk comprises:
directing said external magnetic field in an in-plane direction of said HDD.

11. The method of claim 8, wherein said method comprises:
synchronizing read/write operations and said suppressing said ATI/FTI based on said external magnetic field.

12. The method of claim 8, wherein said directing said external magnetic field further comprises:
directing said external magnetic field perpendicular to a track on said data storage surface.

* * * * *